(12) United States Patent
Wang et al.

(10) Patent No.: US 11,892,970 B2
(45) Date of Patent: Feb. 6, 2024

(54) SYNCHRONIZING COPROCESSORS USING SYNCHRONIZATION INSTRUCTIONS TO FORCE A SECOND COPROCESSOR TO WAIT UNTIL RECEIVING AN ACKNOWLEDGEMENT SIGNAL FROM A FIRST COPROCESSOR

(71) Applicant: KUNLUNXIN TECHNOLOGY (BEIJING) COMPANY LIMITED, Beijing (CN)

(72) Inventors: Jing Wang, Beijing (CN); Jiaxin Shi, Beijing (CN); Hanlin Xie, Beijing (CN); Xiaozhang Gong, Beijing (CN)

(73) Assignee: KUNLUNXIN TECHNOLOGY (BEIJING) COMPANY, Beijing (CN)

( * ) Notice: Subject to any disclaimer, the term of this patent is extended or adjusted under 35 U.S.C. 154(b) by 0 days.

(21) Appl. No.: 17/867,832

(22) Filed: Jul. 19, 2022

(65) Prior Publication Data

US 2022/0350774 A1    Nov. 3, 2022

(30) Foreign Application Priority Data

Jul. 20, 2021   (CN) .......................... 202110819670.6

(51) Int. Cl.
  *G06F 9/52*   (2006.01)
  *G06F 15/78*  (2006.01)
(52) U.S. Cl.
  CPC ................ *G06F 15/7807* (2013.01)
(58) Field of Classification Search
  CPC . G06F 9/52; G06F 9/522; G06F 9/526; G06F 15/7807
  See application file for complete search history.

(56) References Cited

U.S. PATENT DOCUMENTS

| 7,032,099 | B1* | 4/2006 | Imamura | G06F 9/52 |
| | | | | 718/102 |
| 2020/0210301 | A1* | 7/2020 | Nandan | G06F 11/2236 |
| 2021/0124626 | A1* | 4/2021 | Manula | G06F 9/52 |
| 2022/0308879 | A1* | 9/2022 | Rusitoru | G06F 9/30145 |

FOREIGN PATENT DOCUMENTS

| CN | 101833537 A | 9/2010 |
| CN | 102446157 A | 5/2012 |

OTHER PUBLICATIONS

Office Action for Chinese Patent Application No. 202110819670.6, dated Dec. 11, 2023, 43 pages.

* cited by examiner

*Primary Examiner* — Jacob Petranek
(74) *Attorney, Agent, or Firm* — Lippes Mathias LLP

(57) ABSTRACT

A method for data processing, a processor chip. The method includes: acquiring a first relationship instruction; executing at least one first computing instruction acquired before the first relationship instruction based on the first relationship instruction; and sending acknowledgment information based on the first relationship instruction in response to completing executing the at least one first computing instruction, to cause a second coprocessor receiving the acknowledgment information to revert to a state of acquiring a second computing instruction after the second relationship instruction acquired by a second coprocessor based on the acknowledgment information.

9 Claims, 6 Drawing Sheets

SYNCHRONIZING COPROCESSORS USING SYNCHRONIZATION INSTRUCTIONS TO FORCE A SECOND COPROCESSOR TO WAIT UNTIL RECEIVING AN ACKNOWLEDGEMENT SIGNAL FROM A FIRST COPROCESSOR

CROSS-REFERENCE TO RELATED APPLICATION

This application claims priority to Chinese Patent Application No. 202110819670.6 filed on Jul. 20, 2021, the disclosure of which is hereby incorporated by reference in its entirety.

TECHNICAL FIELD

The present disclosure relates to a field of artificial intelligence (AI) chip technologies, and specifically to a method for data processing, a processor chip, an electronic device and a medium.

BACKGROUND

In a system on chip processor, different processor cores cooperate with each other to complete a computing task. For example, accelerators or processors for deep learning, or accelerators or processors for big data processing, may construct a heterogeneous processor to jointly implement a computing task, that is, the output data of a previous coprocessor in the heterogeneous processor may be used by a next processor during the computing process.

It is an urgent technical problem to be solved how to control cooperation between coprocessors to improve the overall running efficiency of the heterogeneous processor.

SUMMARY

According to embodiments of the disclosure, a method for data processing is proved. The method is performed by a first coprocessor, and includes: acquiring a first relationship instruction; executing at least one computing instruction acquired before the first relationship instruction based on the first relationship instruction; and sending acknowledgment information based on the first relationship instruction in response to completing executing the at least one computing instruction, to cause a second coprocessor receiving the acknowledgment information to revert to a state of acquiring a computing instruction based on the acknowledgment information.

According to embodiments of the disclosure, a method for data processing is proved. The method is performed by a second coprocessor is provided, and includes: acquiring a second relationship instruction sent by a control unit; stopping acquiring a computing instruction from a command queue corresponding to the second coprocessor in response to acquiring the second relationship instruction; monitoring acknowledgment information sent by the first coprocessor; and reverting to acquiring a computing instruction from the command queue based on the acknowledgment information to perform data processing based on the acquired computing instruction.

According to embodiments of the disclosure, a processor chip is provided, and the processor chip includes a control unit, a first coprocessor and a second coprocessor. The control unit is configured to send a first computing instruction and a first relationship instruction to the first coprocessor, and send a second computing instruction and a second relationship instruction to the second coprocessor. The first coprocessor is configured to perform the method for data processing as described in the above first aspect. The second coprocessor is configured to perform the method for data processing as described in the above second aspect.

According to embodiments of the disclosure, an electronic device is provided. The electronic device includes: at least one processor; and a memory communicatively connected to the at least one processor; the memory is stored with instructions executable by the at least one processor, the instructions are executed by the at least one processor, to cause the at least one processor to perform the method as described in the above embodiments.

According to embodiments of the disclosure, a non-transitory computer-readable storage medium stored with computer instructions is provided, the computer instructions are configured to perform the method as described in the above embodiments.

According to embodiments of the disclosure, a computer program product including a computer program is provided, the computer program is configured to implement the method as described in the first aspect or the method as described in the above embodiments.

It should be understood that, the content described in the part is not intended to identify key or important features of embodiments of the present disclosure, nor intended to limit the scope of the present disclosure. Other features of the present disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

A method and an apparatus for data processing, a processor chip, an electronic device and a medium according to embodiments of the present disclosure are described with reference to the accompanying drawings.

A heterogeneous processor includes a plurality of coprocessors and a control unit, and the coprocessors often cooperates with each other to complete one computing task. For example, in a scene of deep learning in artificial intelligence, or in a scene of big data processing, output data of a previous coprocessor may be used by a next processor in a computing process. In a scene where there is a data dependency between coprocessors, a synchronization mechanism needs to be implemented, so that each processor runs at a correct time point, and a next coprocessor cannot be started before a previous coprocessor completes processing.

Figure 1:
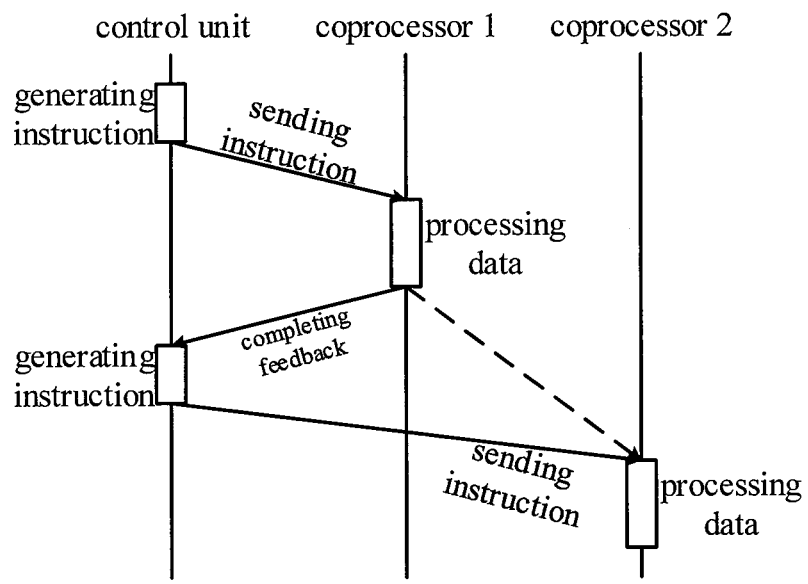
FIG. 1 is a diagram illustrating coordination between coprocessors in the related art.

The heterogeneous processor in the related art synchronizes the coprocessors by a control unit, so that each coprocessor runs at the correct time point. As illustrated in FIG. 1, for example, two instructions sent to different coprocessors have a data dependency relationship, and need to be synchronized. After generating a first instruction, a control unit first sends the first instruction to a corresponding coprocessor 1, and then the control unit is blocked to wait for the coprocessor 1 to return a completion signal. The control unit does not generate a second instruction or send the second instruction to a next coprocessor 2 until the control unit receives the completion signal of the previous coprocessor 1. In this way, it may ensure that the coprocessors may run in a correct order.

However, in the above processing manner, the control unit needs to be blocked to wait during the running process of the coprocessor 1, and the execution time of the control unit itself is unable to be covered, which affects the overall efficiency. At the same time, there is a time overhead for sending the instructions and the completion signal between the control unit and the coprocessors at different time points, which also affects the overall efficiency.

For this purpose, a method for data processing is provided in the disclosure, the method is performed by a first coprocessor of artificial intelligence. The first coprocessor acquires a first relationship instruction, and executes at least one computing instruction acquired before the first relationship instruction based on the first relationship instruction. The first coprocessor sends acknowledgment information based on the first relationship instruction in response to completing executing the at least one computing instruction, so that a second coprocessor receiving the acknowledgment information reverts to, based on the acknowledgment information, a state of acquiring a computing instruction. In the disclosure, the acknowledgment information is generated between the first coprocessor and the second coprocessor based on the first relationship instruction, and the coprocessors can self-coordinate the running time between the coprocessors based on the acknowledgment information, which improves the overall running efficiency.

Figure 2:
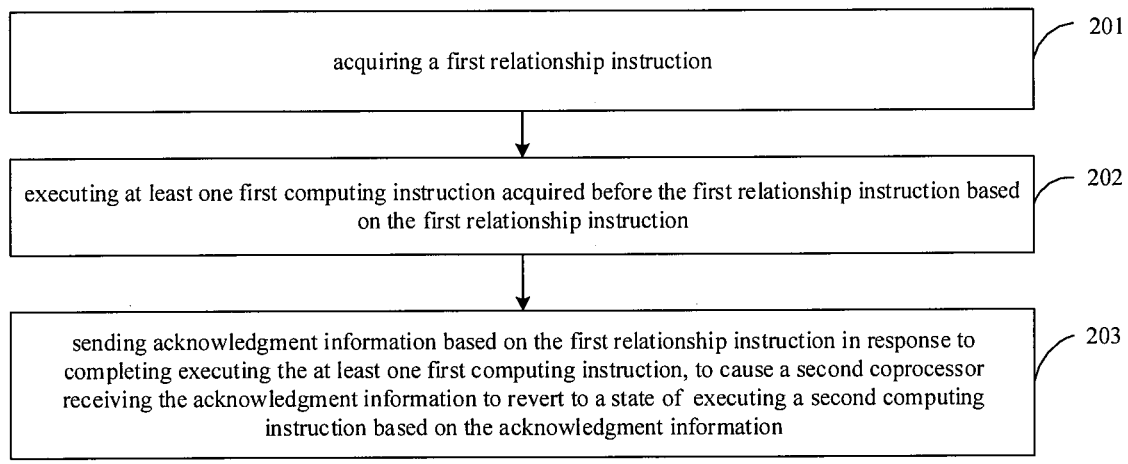
FIG. 2 is a flowchart illustrating a method for data processing according to an embodiment of the present disclosure.

FIG. 2 is a flowchart illustrating a method for data processing provided in the embodiment of the present disclosure.

As illustrated in FIG. 2, the method may include the following blocks:

At block 201, a first relationship instruction is acquired.

In the embodiments of the disclosure, a relationship instruction is set, and the relationship instruction is configured to describe a dependency relationship between coprocessors. The dependency relationship indicates a dependency order of executions of the coprocessors in a computing process. That is, execution startup of one coprocessor relies on acknowledgment of another coprocessor having a dependency relationship with the one coprocessor. Starting time is coordinated by sending acknowledgment information in embodiments of the disclosure. Thus, in the embodiments of the disclosure, in order to facilitate explanation, a coprocessor sending the acknowledgment information in the coprocessors having a dependency relationship is referred to as a first coprocessor, and a coprocessor executed after receiving the acknowledgment information is referred to as a second processor, so that a relationship instruction received by the first coprocessor is referred to as the first relationship instruction, and a relationship instruction received by the second coprocessor is referred to as a second relationship instruction. The second coprocessor will be described in subsequent embodiments.

An execution body of this embodiment of the disclosure is the first coprocessor.

The first relationship instruction may be implemented by a compiler, so that those skilled in the art may freely and flexibly design a dependency relationship between various coprocessors by means of programming control, so as to meet different computing task requirements.

In the embodiment of the disclosure, the first relationship instruction is generated by a control unit, and the first coprocessor acquires the first relationship instruction from the control unit.

At block 202, at least one first computing instruction acquired before the first relationship instruction is executed based on the first relationship instruction.

In some embodiments, the control unit parses a program to be executed to obtain corresponding instructions. The instructions obtained by parsing includes the first computing instruction and the first relationship instruction. The control unit sequentially sends the first computing instruction and the first relationship instruction obtained by parsing to the first coprocessor based on an order of instructions set in the program. The first coprocessor executes the first computing instruction after receiving the first computing instruction. The first coprocessor counts the at least one first computing instruction received before receiving the first relationship instruction based on the first relationship instruction after receiving the first relationship instruction, and the first coprocessor executes the at least one first computing instruction.

At block 203, acknowledgment information is sent based on the first relationship instruction in response to completing executing the at least one computing instruction, to cause the second coprocessor receiving the acknowledgment information to revert to a state of acquiring a computing instruction based on the acknowledgment information.

In some embodiments, the first relationship instruction indicates a dependency relationship between the first coprocessor and the second coprocessor, and the first relationship instruction can determine the at least one first computing instruction received before the first instruction. The acknowledgment information is generated and sent to the second coprocessor based on the dependency relationship between the first coprocessor and the second coprocessor indicated by the first relationship instruction when execution of the at least one computing instruction acquired before the first relationship instruction is completed, so that the second coprocessor receiving the acknowledgment information reverts to the state of acquiring a second computing instruction based on the acknowledgment information. That is, the second coprocessor is in a blocking state of stopping acquiring and executing the second computing instruction posterior to the second relationship instruction before receiving the acknowledgment information, so that the second coprocessor waits for an acknowledgment signal sent by the first coprocessor before starting a specific computing task. Thus, the first coprocessor and the second coprocessor may self-coordinate the running time, which greatly improves the overall running efficiency of the processor.

It should be noted that, in the embodiment of the disclosure, the first coprocessor may send the acknowledgment information to the second coprocessor in a point-to-point manner or in a broadcast manner, and different embodiments may be used in the subsequent embodiments to respectively describe the manners of sending the acknowledgment information.

With the method for data processing in the embodiment of the disclosure, the first relationship instruction is acquired, and the at least one first computing instruction acquired before the first relationship instruction is executed based on the first relationship instruction, and the acknowledgment information is sent based on the first relationship instruction in response to completing executing the at least one first computing instruction, so that the second coprocessor receiving the acknowledgment information reverts to the state of acquiring the second computing instruction posterior to the second relationship instruction based on the acknowledgment information. In some embodiments of the disclosure, the acknowledgment information is generated between the first coprocessor and the second coprocessor based on the first relationship instruction, and self-coordination of running time between the coprocessors is realized based on the acknowledgment information, which enhances the overall running efficiency.

Figure 3:
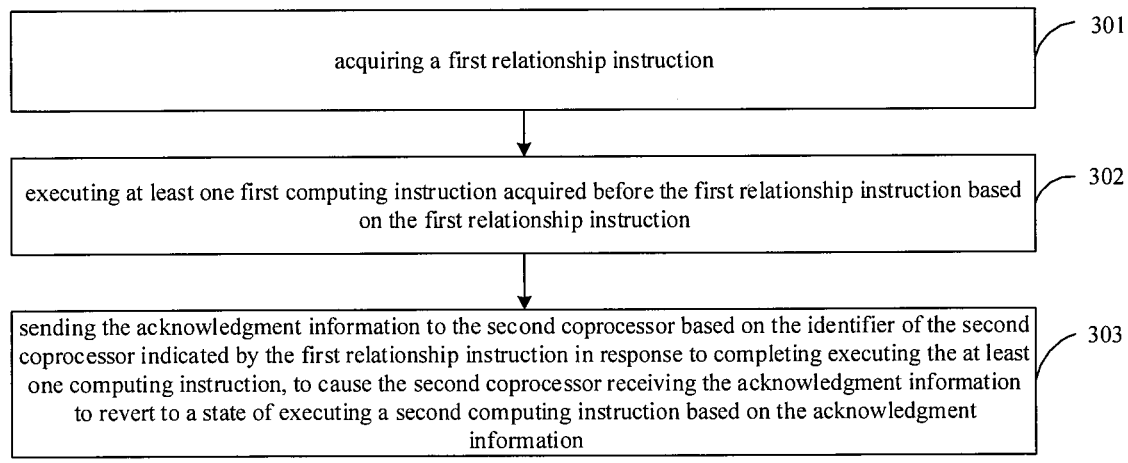
FIG. 3 is a flowchart illustrating a method for data processing according to an embodiment of the present disclosure.

Based on the above embodiments, another embodiment of the method for data processing is provided, which illustrates that the first relationship instruction received by the first coprocessor includes an identifier of the second coprocessor having a dependency relationship with the first coprocessor, thereby the acknowledgment information may be sent to the second coprocessor in a point-to-point manner. FIG. 3 is a flowchart illustrating a method for data processing according to an embodiment of the disclosure. As illustrated in FIG. 3, the method includes the following blocks:

At block 301, a first relationship instruction is acquired.

The first relationship instruction includes a keyword and the identifier of the second coprocessor having a dependency relationship with the first coprocessor. The identifier of the second coprocessor may be configured to uniquely identify the second coprocessor, and the specific identification method is not limited in the disclosure. The keyword indicates that the first coprocessor is a sending party, that is, the first relationship instruction indicates that the first coprocessor may send acknowledgment information to the second coprocessor indicated by the identifier.

The explanation of block 201 is also suitable for this embodiment of the disclosure, with the same principle, which is not repeated here.

In an implementation of the embodiment of the disclosure, the first relationship instruction may be represented as:

| keyword: send signal | identifier of second coprocessor used for receiving |

For example, 'SEND to P2' is the first relationship instruction, in which, 'SEND to' is the keyword, and 'P2' is the identifier of the second coprocessor used for receiving.

In the embodiment of the disclosure, the dependency relationship means that the second coprocessor relies on the execution result of the first coprocessor. Thus, the first coprocessor may send the acknowledgment information to the second coprocessor after executing the corresponding result. Therefore, the first relationship instruction indicates that the first coprocessor sends the acknowledgment information to the second coprocessor after completing executing the computing task ahead of the first relationship instruction.

At block 302, at least one first computing instruction acquired before the first relationship instruction is executed based on the first relationship instruction.

In the embodiment of the disclosure, the first coprocessor may determine how many first computing instructions are received ahead of the first relationship instruction after receiving the first computing instruction. That is, how many computing tasks that are executed but have not been completed is determined and recorded.

The explanation of block 202 is also suitable for this embodiment of the disclosure, with the same principle, which is not repeated here.

At block 303, acknowledgment information is sent to a second coprocessor based on the identifier of the second coprocessor indicated by the first relationship instruction in response to completing executing the at least one computing instruction, to cause the second coprocessor receiving the acknowledgment information to revert to a state of acquiring a second computing instruction based on the acknowledgment information.

In the embodiment of the disclosure, based on the content included in the first relationship instruction, in response to completing executing the at least one computing instruction, i.e., after execution of all the corresponding computing tasks are completed, an acknowledgment signal may be sent to the specified second coprocessor based on the content indicated by the first relationship instruction, so that the second coprocessor receiving the acknowledgment information reverts to the state of executing the second computing instruction received after receiving the second relationship instruction based on the acknowledgment information.

It should be understood that, the first coprocessor may simply record the first computing instruction that has not be completed when receiving the first relationship instruction, a first computing instruction received after the first relationship instruction has nothing to do with the acknowledgment signal that is sent based on the first relationship instruction. The first coprocessor is configured to send the acknowledgment signal without block, and can continue to execute a first computing instruction received after the first relationship instruction. The first coprocessor can send the acknowledgment information to the second coprocessor as long as execution of all the at least one first computing instruction received before the first relationship instruction is complemented.

Figure 4:
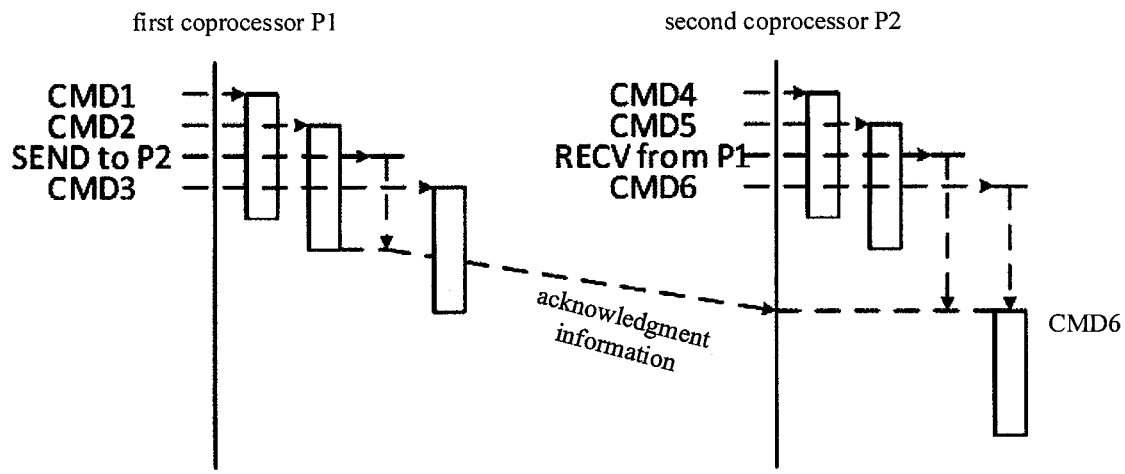
FIG. 4 is a schematic diagram of sending acknowledgment information according to an embodiment of the present disclosure.

In order to clarify the embodiments of the disclosure, an example is provided. FIG. 4 is a schematic diagram of sending acknowledgment information according to an embodiment of the present disclosure. As illustrated in FIG. 4, the instructions continuously received by the first coprocessor P1 are CMD1, CMD2, SEND to P2 and CMD3. CMD1, CMD2, CMD3 are first computing instructions, and Send to P2 is a first relationship instruction, in which 'SEND to' is a keyword, and 'P2' is an identifier of the second coprocessor used for receiving. In general, a coprocessor has a long flow line, and the instructions are executed in sequence. Therefore, a previous instruction may still be executed when a subsequent instruction starts to be executed. The first coprocessor P1 has received the first computing instructions CMD 1 and CMD 2 before receiving the first relationship instruction Send to P2. Therefore, a condition for the first coprocessor P1 to send the acknowledgment signal to the second coprocessor P2 is that executions of the first computing instructions CMD 1 and CMD 2 are completed. However, the first relationship instruction Send to P2 does not block execution of the subsequent first computing instruction CMD 3. In the embodiment of the present disclosure, based on the keyword and the identifier of the second coprocessor included in the first relationship instruction, the first coprocessor sends the acknowledgment information to the corresponding second coprocessor based on the indicated identifier after computation of corresponding computing tasks are completed, so that the second coprocessor may revert to executing the second computing instruction received after the second relationship instruction, to execute a corresponding processor task. Thus, a synchronization process between the coprocessors can be controlled based on the relationship instruction and the acknowledgment information, which improves overall running efficiency of a heterogeneous processor.

It should be noted that, when multiple second coprocessors have a dependency relationship with the first coprocessor, for example, two, the identifier part for indicating the second coprocessors configured for receiving in the first relationship instruction may include identifiers of the two second coprocessors. For example, the first coprocessor P1 sends the acknowledgment information to both a second coprocessor P2 and a second coprocessor P3 based on the identifiers indicated in the first relationship instruction.

With the method for data processing in the embodiment of the disclosure, the first relationship instruction is acquired, and at least one first computing instruction acquired before the first relationship instruction is executed based on the first relationship instruction, and the acknowledgment information carrying the identifier information is sent based on the first relationship instruction in response to completing execution of the at least one first computing instruction, so that the second coprocessor receiving the acknowledgment information reverts to the state of acquiring the second computing instruction based on the acknowledgment information. In the disclosure, the acknowledgment information is generated between the first coprocessor and the second coprocessor generate based on the first relationship instruction, and self-coordination of running time between coprocessors is realized based on the acknowledgment information, which improving the overall running efficiency.

Figure 5:
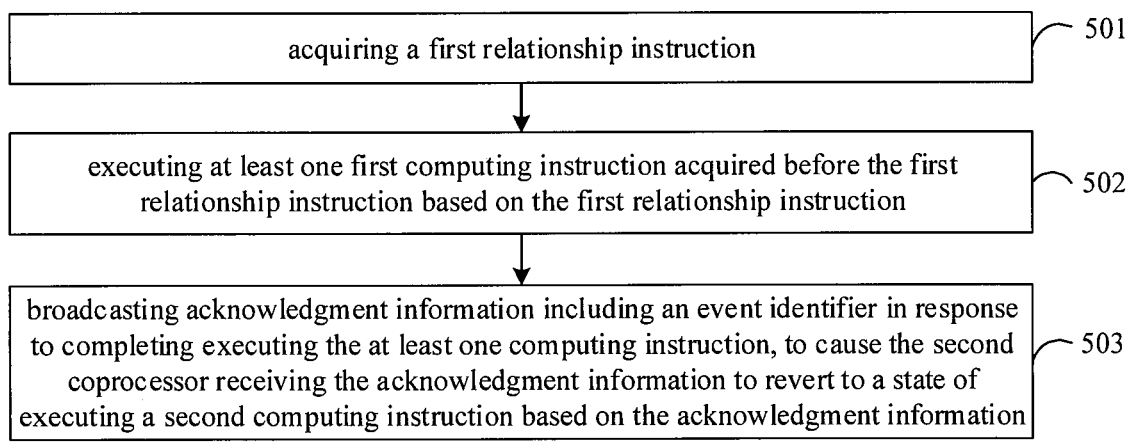
FIG. 5 is a flowchart illustrating a method for data processing according to an embodiment of the present disclosure.

Based on the above embodiment, a method for data processing is provided in the embodiment. The first coprocessor sends acknowledgment information by means of broadcast. FIG. 5 is a flowchart illustrating a method for data processing according to an embodiment of the disclosure. As illustrated in FIG. 5, the method includes the following blocks:

At block 501, a first relationship instruction is acquired.

In the embodiment of the present disclosure, the first relationship instruction includes a set keyword and an event identifier. Each event number of the event identifier may correspond to an event with specific meaning, and may be planned by a software programming personnel. For example, the event is the count of user clicks within a set time period. A keyword indicates that the first coprocessor is a sending party. That is, the first relationship instruction indicates that the first coprocessor may send the event identifier. In the embodiment of the disclosure, the event identifier is sent by means of broadcast.

In an implementation of the embodiment of the disclosure, the first relationship instruction may be represented as:

| keyword: send signal | event identifier |
| --- | --- |

For example, 'SEND 1' is a first relationship instruction, in which 'SEND' is a keyword, and '1' is an event identifier. For example, '1' indicates the count of user clicks within a set time period.

In some embodiments of the disclosure, the dependency relationship means that the second coprocessor relies on the execution result of the first coprocessor. The first relationship instruction indicates that the first coprocessor may send acknowledgment information in response to completing execution of computing tasks ahead of the first relationship instruction, so that the second coprocessor replying on the execution result of the first coprocessor may execute a corresponding computing instruction based on the acknowledgment information.

At block 502, at least one first computing instruction acquired before the first relationship instruction is executed based on the first relationship instruction.

In the embodiment of the disclosure, the first coprocessor may determine how many first computing instructions are received ahead of the first relationship instruction after receiving the first computing instruction. That is, how many computing tasks that are executed but have not been completed is determined and recorded.

At block 503, acknowledgment information including the event identifier is broadcast in response to completing executing the at least one computing instruction, to cause the second coprocessor receiving the acknowledgment information to revert to a state of acquiring a second computing instruction based on the acknowledgment information.

In the embodiment of the disclosure, based on the content included in the first relationship instruction, in response to completing executing the at least one computing instruction, that is, execution of all the corresponding computing tasks are completed, acknowledgment information including the event identifier may be broadcast based on the content indicated in the first relationship instruction, to cause the second coprocessor receiving the acknowledgment information to revert to the state of acquiring the second computing instruction after receiving the second relationship instruction based on the acknowledgment information.

It should be understood that, the first coprocessor may simply record the first computing instruction that has not been completed when receiving the first relationship instruction, a first computing instruction received after the first relationship instruction has nothing to do with the acknowledgment signal that is sent based on the first relationship instruction. The first coprocessor is configured to send the acknowledgment signal without block, and can continue to execute a first computing instruction received after the first relationship instruction. The first coprocessor can send the acknowledgment information to the second coprocessor as long as execution of all the at least one first computing instruction received before the first relationship instruction is complemented.

Figure 6:
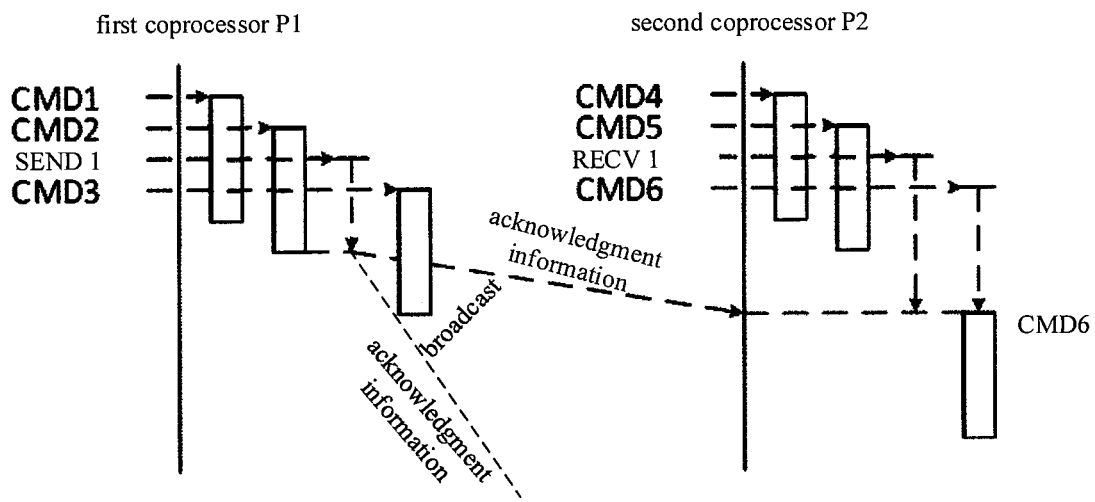
FIG. 6 is a schematic diagram of sending acknowledgment information according to an embodiment of the present disclosure.

In order to clarify the embodiment of the disclosure, an example is provided. FIG. 6 is a schematic diagram of sending acknowledgment information according to an embodiment of the present disclosure. As illustrated in FIG. 6, the instructions continuously received by the first coprocessor P1 are CMD1, CMD2, SEND1 and CMD3. CMD1, CMD2, CMD3 are first computing instructions, and SEND1 is a first relationship instruction, in which, 'SEND' is a keyword "send", and '1' is an event identifier. In general, the coprocessor has a relatively long flow line, and the instructions are executed as a flow. Therefore, a previous instruction may still be executed when a subsequent instruction starts to be executed. The first coprocessor P1 has received the first computing instructions CMD1 and CMD2 before receiving the first relationship instruction SEND1. Therefore, a condition for the first coprocessor P1 to broadcast an acknowledgment signal is that executions of the first computing instructions CMD1 and CMD2 are completed. However, the first relationship instruction SEND1 does not block execution of the subsequent first computing instruction CMD3. In the embodiment of the present disclosure, based on the keyword and the event identifier included in the first relationship instruction, the first coprocessor sends the event identifier by means of broadcast after computation of corresponding computing tasks are completed, so that each second coprocessor receiving the event identifier may determine to recover executing a second computing instruction received after the second relationship instruction based on the second relationship instruction received, to execute a corresponding processor task. In the disclosure, when multiple second coprocessors have a dependency relationship with the first coprocessor, the acknowledgment information is sent by means of broadcast, which improves sending efficiency of the first coprocessor. In addition, a synchronization process between the coprocessors can be controlled based on the relationship instruction and the acknowledgment information, improving overall running efficiency of a heterogeneous processor.

It should be noted that, after the second coprocessor receives the second relationship instruction, a second computing instruction following the second relationship instruction may be further received from a control unit by the second coprocessor. Alternatively, a second computing instruction may be prevented from being received from the control unit after the second relationship instruction is received, and may be obtained and executed from the control unit after the acknowledgment information is received.

It should be understood that the explanation of blocks 201 to 203 is also suitable for the embodiment of the disclosure, with the same principle, which is not repeated here.

With the method for data processing in the embodiment of the disclosure, the first relationship instruction is acquired, and at least one first computing instruction acquired before the first relationship instruction is executed based on the first relationship instruction, and the acknowledgment information is sent by means of broadcast based on the first relationship instruction in response to completing executing the at least one first computing instruction, so that the second coprocessor receiving the acknowledgment information reverts to the state of acquiring the computing instruction based on the acknowledgment information. In the disclosure, the acknowledgment information is generated between the first coprocessor and the second coprocessor generate based on the first relationship instruction, and self-coordination of running time between coprocessors is realized based on the acknowledgment information, which improving the overall running efficiency.

Figure 7:
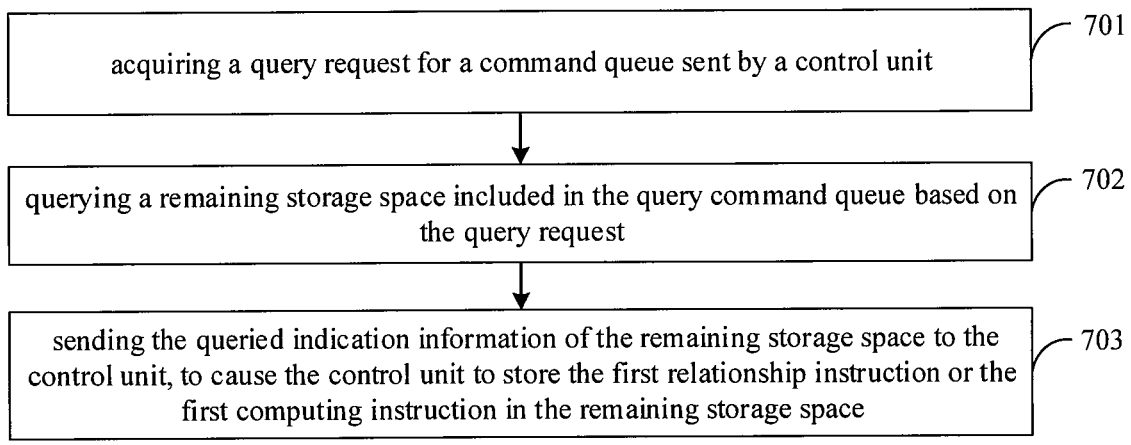
FIG. 7 is a flowchart illustrating a method for data processing according to an embodiment of the present disclosure.

Based on the above embodiment, an implementation is provided in an embodiment. FIG. 7 is a flowchart illustrating a method for data processing according to an embodiment of the disclosure. As illustrated in FIG. 7, before blocks 201, 301 and 501, the following blocks are further included.

At block 701, a query request for a command queue sent by a control unit is acquired.

At block 702, a remaining storage space included in the query command queue is queried based on the query request.

At block 703, queried indication information of the remaining storage space is sent to the control unit, to cause the control unit to store the first relationship instruction or the first computing instruction in the remaining storage space.

A corresponding command queue is configured in the first coprocessor, and the command queue is configured to store instructions sent by the control unit to the first coprocessor, for example, the first computing instruction or the first relationship instruction.

In the embodiments of the present disclosure, the first coprocessor queries the remaining storage space in the command queue corresponding to the first coprocessor based on the acquired query request sent by the control unit, and the queried indication information of the remaining storage space is sent to the control unit. The indication information may be address information of the storage space, so that the control unit stores the first relationship instruction or the first computing instruction in the remaining storage space based on the indication information. Thus, the control unit may store the instruction obtained by parsing in the command queue corresponding to the first coprocessor first in the process of coordinating running time between the first coprocessor and the second coprocessor, and the control unit can send instructions to the first coprocessor without blocking, so that the control unit and each coprocessor may be run in parallel, which improves the running efficiency of a heterogeneous processor.

Figure 8:
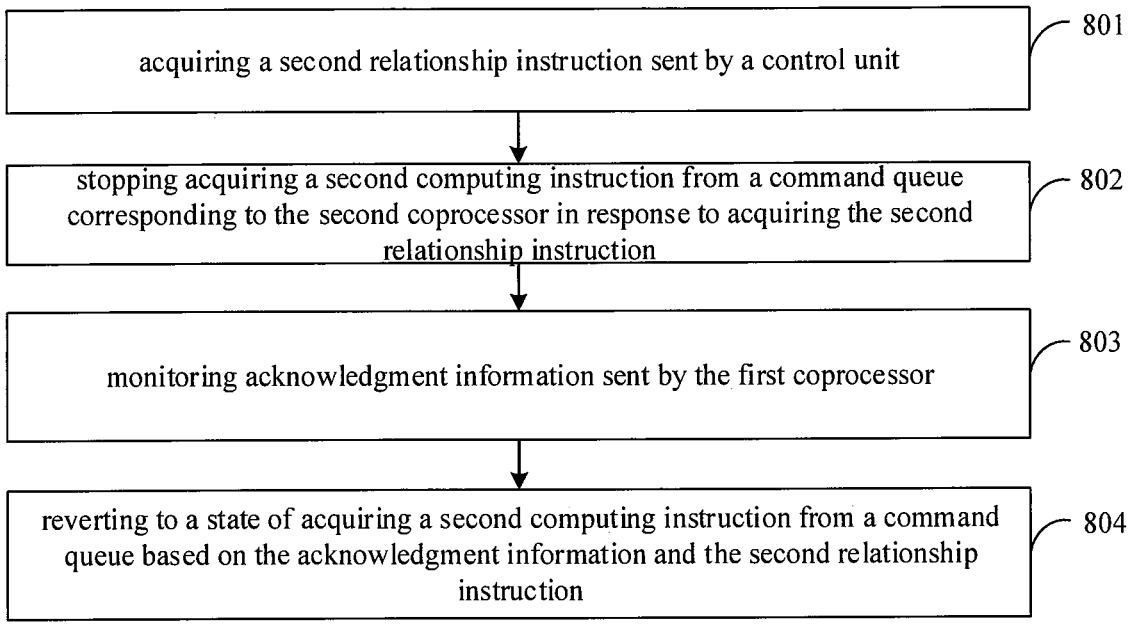
FIG. 8 is a flowchart illustrating a method for data processing according to an embodiment of the present disclosure.

Based on the above embodiments, a method for data processing is provided in the embodiments, and the method is performed by a second coprocessor in a chip. FIG. 8 is a flowchart illustrating a method for data processing according to an embodiment of the disclosure. As illustrated in FIG. 8, the method includes the following blocks:

At block 801, a second relationship instruction sent by a control unit is acquired.

The explanation of the second relationship instruction may refer to the explanation of block 201, with the same principle, which will not be repeated here.

At block 802, acquiring a second computing instruction from a command queue corresponding to the second coprocessor is stopped in response to acquiring the second relationship instruction.

The command queue is configured to store instructions acquired from the control unit, including the second relationship instruction and the second computing instruction.

In the embodiment of the disclosure, the second coprocessor may stop acquiring a second computing instruction from the corresponding command queue in response to acquiring the second relationship instruction. That is, after the second relationship instruction is acquired, further instruction acquisition may be blocked to wait for acknowledgment information.

It should be noted that, the second coprocessor may stop acquiring an instruction from the command queue. However, the control unit may continue sending instructions to the command queue until there is no storage space in the command queue.

At block 803, acknowledgment information sent by the first coprocessor is monitored.

In an implementation of the embodiment of the disclosure, the second coprocessor acquires the acknowledgment information sent by the first coprocessor.

In an implementation of the embodiment of the disclosure, the second coprocessor acquires the acknowledgment information broadcast by the first coprocessor.

The explanation of sending the acknowledgment information by the first coprocessor may refer to the above embodiments, which will not be repeated here.

At block 804, a state of acquiring a second computing instruction from the command queue is recovered based on the monitored acknowledgment information and the second relationship instruction.

In the embodiment of the present disclosure, the received acknowledgment information carries information that can be used to determine whether matching with the identifier information included in the received second relationship instruction, the second coprocessor determines whether to revert to the state of acquiring the second computing instruction from the command queue by matching the acknowledgment information with the second relationship instruction after receiving the acknowledgment information based on the information carried in the acknowledgment information. After determining to revert to the state of acquiring the second computing instruction from the command queue, the second coprocessor executes a computing instruction acquired after the second relationship instruction after execution of the second computing instruction acquired before the second relationship instruction is completed, so that the first coprocessor and the second coprocessor may self-coordinate running time, which greatly improves the overall running efficiency of the processor.

In the method for data processing in the embodiment of the disclosure, the second coprocessor acquires the second relationship instruction sent by the control unit, and stops acquiring the second computing instruction from the command queue corresponding to the second coprocessor in response to acquiring the second relationship instruction, and monitors the acknowledgment information sent by the first coprocessor, and reverts to the state of acquiring the second computing instruction from the command queue based on the acknowledgment information and the second relationship instruction, so that the coprocessors may self-coordinate running time based on the acknowledgment information and the second relationship instruction, which improves the overall running efficiency.

Figure 9:
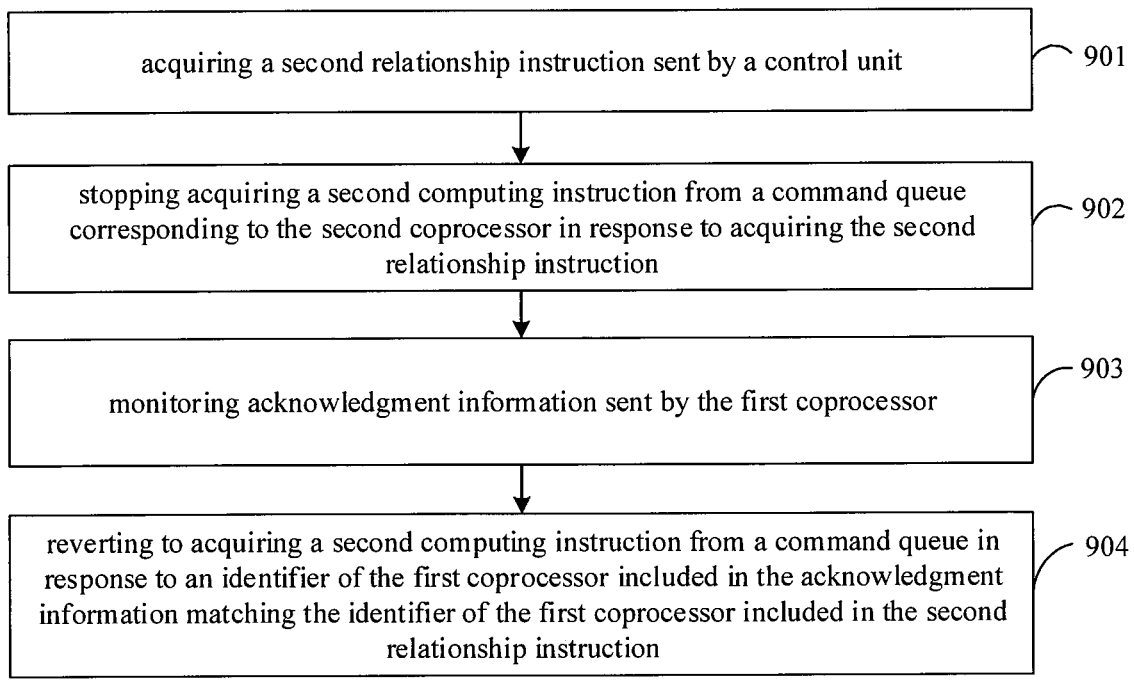
FIG. 9 is a flowchart illustrating a method for data processing according to an embodiment of the present disclosure.

Based on the above embodiments, a method for data processing is provided in an embodiment, which provides how to coordinate running time between different coprocessors based on the relationship information in response to the second relationship instruction including an identifier of the first coprocessor. FIG. 9 is a flowchart illustrating a method for data processing according to an embodiment of the disclosure. As illustrated in FIG. 9, the method includes the following blocks:

At block 901, a second relationship instruction sent by a control unit is acquired.

The second relationship instruction includes a keyword and an identifier of a first coprocessor having a dependency relationship with the second coprocessor. The identifier of the first coprocessor may be configured to uniquely identify the first coprocessor, and the specific identification method is not limited in the disclosure. The keyword indicates that the second coprocessor is a receiving party. That is, the second relationship instruction indicates that the second coprocessor may acquire acknowledgment information sent by the first coprocessor indicated by the identifier.

The explanation of block 201 is also suitable for this embodiment of the disclosure, with the same principle, which is not repeated here.

In an implementation of the embodiment of the disclosure, the second relationship instruction may be represented as:

| Keyword: receive signal | identifier of first coprocessor used for sending |
|---|---|

For example, 'RECV from P1' is the second relationship instruction, in which, 'RECV from' is the keyword, and 'P1' is the identifier of the first coprocessor used for sending the acknowledgment information.

At block 902, acquiring a second computing instruction from a command queue corresponding to the second coprocessor is stopped in response to acquiring the second relationship instruction.

As illustrated in FIG. 4, the instructions received by the second coprocessor P2 are CMD4, CMD5, RECV from P1 and CMD6. CMD4, CMD5, CMD6 are second computing instructions, and RECV to P1 is a second relationship instruction. The second coprocessor P2 receives the second computing instructions CMD4 and CMD5 before the second relationship instruction RECV from P1, in which, CMD4 and CMD5 may continue being executed. However, the second computing instruction CMD6 may be blocked before the second coprocessor P2 receives the acknowledgment information from the first coprocessor P1. That is, the second coprocessor P2 stops acquiring CMD6 from the command queue.

At block 903, acknowledgment information sent by the first coprocessor is monitored.

Blocks 901 to 903 may refer to the explanation of the above embodiments, with the same principle, which will not be repeated here.

At block 904, acquiring a second computing instruction from the command queue is recovered in response to an identifier of the first coprocessor included in the acknowledgment information matching the identifier of the first coprocessor included in the second relationship instruction.

The second relationship instruction includes an identifier of a coprocessor (i.e., the first coprocessor) having a dependency relationship with the second coprocessor.

The acknowledgment information includes an identifier of the first coprocessor, and the second coprocessor recovers acquiring the second computing instruction from the command queue in response to the identifier of the coprocessor included in the acknowledgment information matching the identifier of the coprocessor included in the second relationship instruction.

Further, as an implementation, as illustrated in FIG. 4, after the acknowledgment information is received, when the identifier information in the acknowledgment information and the second relationship instruction matches, the second coprocessor executes the second computing instruction CMD6 received after the second relationship instruction RECV from P1 after execution of the second computing instructions CMD4 and CMD5 received before the second relationship instruction RECV from P1 are completed.

In the method for data processing in the embodiment of the disclosure, the second coprocessor acquires the second relationship instruction sent by the control unit, and stops acquiring the second computing instruction from the command queue corresponding to the second coprocessor in response to acquiring the second relationship instruction, and monitors the acknowledgment information sent by the first coprocessor, and reverts to the state of acquiring the second computing instruction from the command queue based on the acknowledgment information and the second relationship instruction, so that the coprocessors may self-coordinate running time based on the acknowledgment information and the second relationship instruction, which improves the overall running efficiency.

Figure 10:
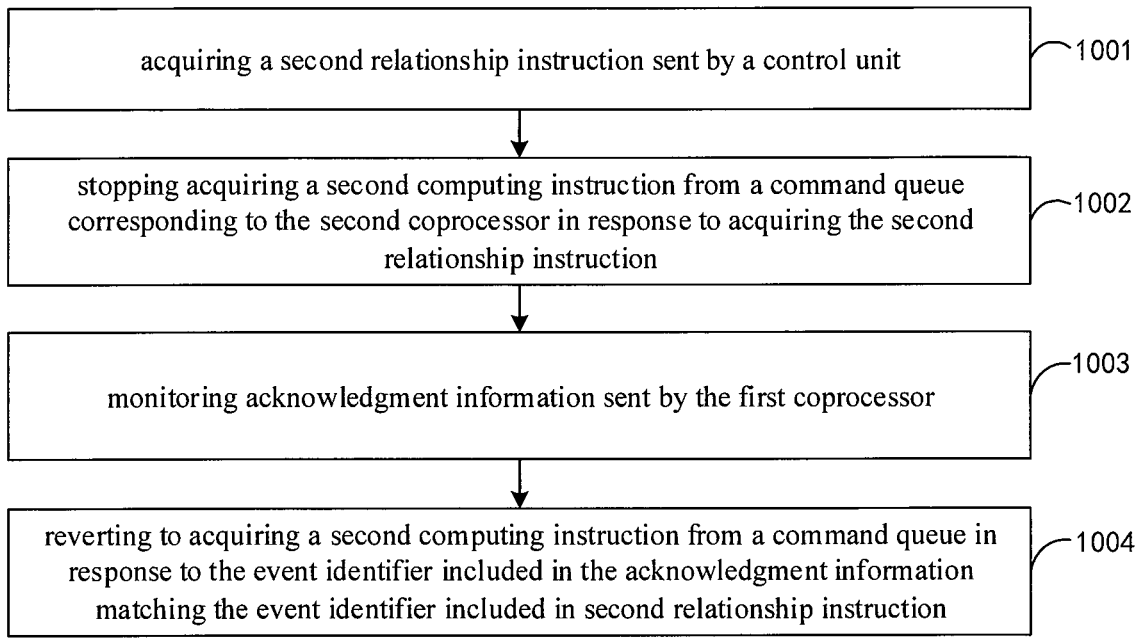
FIG. 10 is a flowchart illustrating a method for data processing according to an embodiment of the present disclosure.

Based on the above embodiment, a method for data processing is further provided. It indicates how to coordinate running time between different coprocessors based on the relationship information in response to the relationship instruction including identifier information of an event. FIG. 10 is a flowchart illustrating a method for data processing according to an embodiment of the disclosure. As illustrated in FIG. 10, the method includes the following blocks.

At block 1001, a second relationship instruction sent by a control unit is acquired.

In the embodiment of the present disclosure, the second relationship instruction includes a set keyword and an event identifier. Each event number of the event identifier may correspond to an event with specific meaning, and may be planned by a software programming personnel. For example, the event is the count of user clicks within a set time period. A keyword indicates that the second coprocessor is a receiving party. That is, the second relationship instruction indicates that the second coprocessor may acquire the event identifier. In the embodiment of the disclosure, the event identifier is sent by means of broadcast.

In an implementation of the embodiment of the disclosure, the second relationship instruction may be represented as:

| Keyword: receive signal | event identifier |
|---|---|

For example, 'RECV 1' is a second relationship instruction, in which 'RECV' is a keyword, and '1' is an event identifier, for example, '1' indicates the count of user clicks within a set time period.

At block 1002, acquiring a second computing instruction from a command queue corresponding to the second coprocessor is stopped in response to acquiring the second relationship instruction.

At block 1003, acknowledgment information sent by the first coprocessor is monitored.

Blocks 1001 to 1003 may refer to the explanation of the above embodiments, with the same principle, which will not be repeated here.

At block 1004, acquiring a second computing instruction from a command queue is recovered in response to the event identifier included in the acknowledgment information matching the event identifier included in the second relationship instruction.

The second relationship instruction includes an event identifier having a dependency relationship with the second coprocessor. For example, the event is the count of user clicks within the set time period, and the event is identified with the number "1".

The acknowledgment information includes an identifier of the first coprocessor. After receiving the acknowledgment information, the second coprocessor compares the identifier of the coprocessor included in the acknowledgment information with the identifier of the coprocessor included in the second relationship instruction, and reverts to acquiring a second computing instruction from the command queue in response to the identifiers matches with each other.

Further, as an implementation, as illustrated in FIG. 4, after receiving the acknowledgment information, if the event identifiers match, the second coprocessor executes the second computing instruction CMD6 received after the second relationship instruction RECV from P1 after execution of the second computing instructions CMD4 and CMD5 received before the second relationship instruction RECV from P1 are completed.

In the method for data processing in the embodiment of the disclosure, the second coprocessor acquires the second relationship instruction sent by the control unit, and stops acquiring the second computing instruction from the command queue corresponding to the second coprocessor in response to acquiring the second relationship instruction, and monitors the acknowledgment information sent by the first coprocessor, and reverts to the state of acquiring the second computing instruction from the command queue based on the acknowledgment information and the second relationship instruction, so that the coprocessors may self-coordinate running time based on the acknowledgment information and the second relationship instruction, which improves the overall running efficiency.

Figure 11:
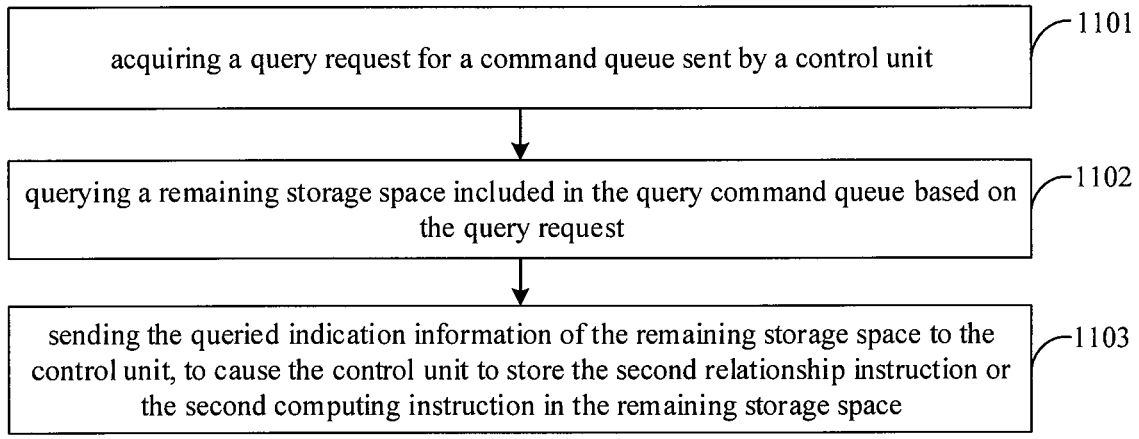
FIG. 11 is a flowchart illustrating a method for data processing according to an embodiment of the present disclosure.

Based on the above embodiment, an implementation is provided in the disclosure. FIG. 11 is a flowchart illustrating a method for data processing according to an embodiment of the disclosure. As illustrated in FIG. 11, before blocks 801, 901 and 1001, the following blocks are further included.

At block 1101, a query request for a command queue sent by a control unit is acquired.

At block 1102, a remaining storage space included in the query command queue is queried based on the query request.

At block 1103, queried indication information of the remaining storage space is sent to the control unit, to cause the control unit to store the second relationship instruction or the second computing instruction in the remaining storage space.

A corresponding command queue is configured in the second coprocessor, and the command queue is configured to store instructions sent by the control unit to the second coprocessor, for example, the second computing instruction or the second relationship instruction.

In some embodiments of the present disclosure, the second coprocessor queries the remaining storage space in the command queue corresponding to the second coprocessor based on the acquired query request sent by the control unit, and the queried indication information of the remaining storage space is sent to the control unit. The indication information may be address information of the storage space, so that the control unit stores the second relationship instruction or the second computing instruction in the remaining storage space based on the indication information. Thus, the control unit may store the instruction obtained by parsing in the command queue corresponding to the second coprocessor first in the process of coordinating running time between the first coprocessor and the second coprocessor, and the control unit can send instructions to the second coprocessor without blocking, so that the control unit and each coprocessor may be run in parallel, which improves the running efficiency of a heterogeneous processor.

To achieve the above embodiments, a processor chip is provided in the embodiments.

Figure 12:
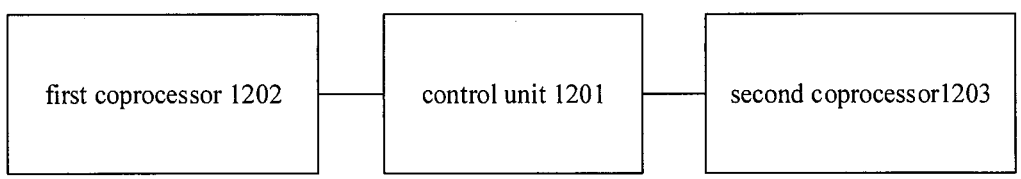
FIG. 12 is a block diagram illustrating a processor chip according to an embodiment of the present disclosure.

FIG. 12 is a block diagram illustrating a processor chip according to an embodiment of the present disclosure. For example, the processor chip is a heterogeneous processor, which may be used in a processor or an accelerator for deep learning or a processor or an accelerator for data processing, to implement a computing task.

In one scene, the accelerator or the processor for the deep learning may abstract each layer of a neural network as an operator, for example, convolution, full connection, pooling, activation, etc., and hardware may be implemented by corresponding multiple modules such as a convolution module, a full connection module, a pooling module, an activation module, to jointly achieve one computing task by calling these modules.

In another scene, the accelerator or the processor for the data processing may abstract each operation in querying a database query as an operator, for example, filtering, connection, sorting, aggregation, etc., and hardware may be implemented by corresponding multiple modules, such as a filtering module, a connection module, a sorting module, an aggregation module, to jointly achieve one computing task by calling these modules.

As illustrated in FIG. 12, the processor chip includes a control unit 1201, a first coprocessor 1202 and a second coprocessor 1203.

The control unit 1201 is configured to send a first computing instruction and a first relationship instruction to the first coprocessor, and send a second computing instruction and a second relationship instruction to the second coprocessor.

The first coprocessor 1202 is configured to perform the method for data processing as described in the embodiments corresponding to FIGS. 2 to 7.

The second coprocessor 1203 is configured to perform the method for data processing as described in the embodiments corresponding to FIGS. 8 to 11.

It may refer to the explanation of the embodiments corresponding to FIGS. 2 to 11, with the same principle, which will not be repeated here.

In the processor chip in the embodiment, the first coprocessor generates the acknowledgment information based on the first relationship instruction acquired from the control unit, and the second coprocessor coordinates the running time between the first coprocessor and the second coprocessor based on the second relationship instruction acquired from the control unit and the acknowledgment information acquired from the first coprocessor without controlling the running time between the first coprocessor and the second coprocessor by a controller, which avoids the overhead of the control unit for controlling the running time and improves the overall running efficiency.

To achieve the above embodiments, an apparatus for data processing is provided in the embodiment.

Figure 13:
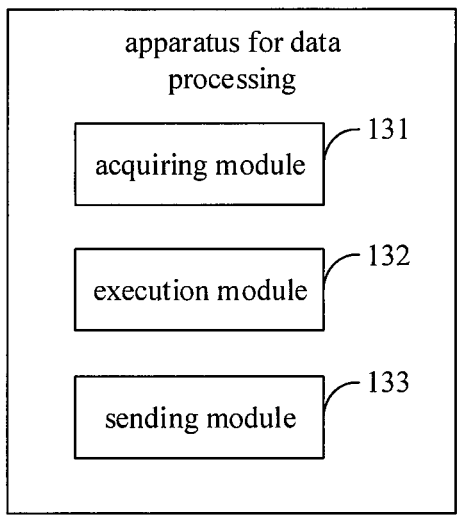
FIG. 13 is a block diagram illustrating an apparatus for data processing according to an embodiment of the present disclosure.

FIG. 13 is a block diagram illustrating an apparatus for data processing according to an embodiment of the present disclosure. As illustrated in FIG. 13, the apparatus includes an acquiring module 131, an execution module 132 and a sending module 133.

The acquiring module 131 is configured to acquire a first relationship instruction.

The execution module 132 is configured to execute at least one first computing instruction acquired before the first relationship instruction based on the first relationship instruction.

The sending module 133 is configured to send acknowledgment information based on the first relationship instruction in response to completing executing the at least one first computing instruction, to cause a second coprocessor receiving the acknowledgment information to revert to a state of acquiring a second computing instruction based on the acknowledgment information. The second computing instruction is acquired after the second coprocessor receives a second relationship instruction.

Further, as an implementation of the embodiment of the disclosure, the first relationship instruction includes an identifier of the second coprocessor having a dependency relationship with the first coprocessor.

The sending module 133 is configured to send the acknowledgment information to the second coprocessor based on the identifier of the second coprocessor indicated by the first relationship instruction in response to completing executing the at least one computing instruction.

As an implementation of the embodiment of the disclosure, the first relationship instruction includes an event identifier.

The sending module 123 is configured to broadcast the acknowledgment information including the event identifier in response to completing executing the at least one computing instruction.

As a possible implementation of the embodiment of the disclosure, the apparatus further includes a query module.

The acquiring module 131 is further configured to acquire a query request for command queue sent by a control unit.

The query module is configured to query a remaining storage space included in the command queue based on the query request.

The sending module 133 is further configured to send the queried indication information of the remaining storage space to the control unit, to cause the control unit to store the first relationship instruction or the first computing instruction in the remaining storage space.

It should be noted that the foregoing explanation of the method embodiments is also suitable for the apparatus embodiments, with the same principle, which will not be repeated here.

In the apparatus for data processing in the embodiment of the disclosure, the first relationship instruction is acquired, and the at least one first computing instruction acquired before the first relationship instruction is executed based on the first relationship instruction, and the acknowledgment information is sent based on the first relationship instruction in response to completing executing the at least one first computing instruction, so that the second coprocessor receiving the acknowledgment information reverts to the state of acquiring the second computing instruction posterior to the second relationship instruction based on the acknowledgment information. In some embodiments of the disclosure, the acknowledgment information is generated between the first coprocessor and the second coprocessor based on the first relationship instruction, and self-coordination of running time between the coprocessors is realized based on the acknowledgment information, which enhances the overall running efficiency.

To achieve the above embodiment, an apparatus for data processing is provided in the embodiments.

Figure 14:
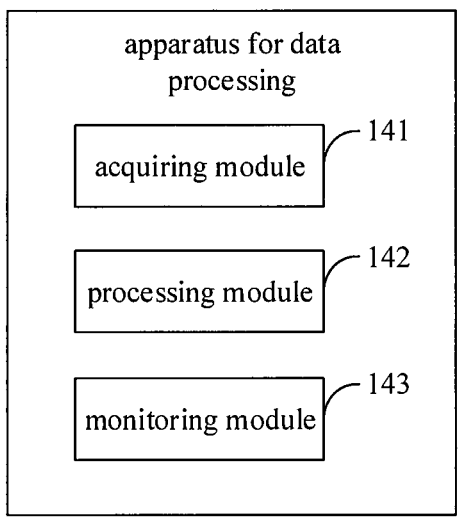
FIG. 14 is a block diagram illustrating an apparatus for data processing according to an embodiment of the present disclosure.

FIG. 14 is a block diagram illustrating an apparatus for data processing according to an embodiment of the present disclosure. As illustrated in FIG. 14, the apparatus includes an acquiring module 141, a processing module 142, and a monitoring module 143.

The acquiring module 141 is configured to acquire a second relationship instruction sent by a control unit.

The processing module 142 is configured to stop acquiring a second computing instruction from a command queue corresponding to the second coprocessor in response to acquiring the second relationship instruction.

The monitoring module 143 is configured to monitor acknowledgment information sent by the first coprocessor.

The processing module 142 is further configured to revert to a state of acquiring a second computing instruction from the command queue based on the acknowledgment information and the second relationship instruction.

Further, in an implementation of the embodiment of the disclosure, the second relationship instruction includes an identifier of the first coprocessor.

The processing module 142 is configured to: revert to acquiring the second computing instruction from the command queue in response to an identifier of the first coprocessor included in the acknowledgment information matching the identifier of the first coprocessor included in the second relationship instruction.

As an implementation of the embodiment of the disclosure, the second relationship instruction includes an event identifier.

The processing module 142 is configured to: revert to acquiring the second computing instruction from the command queue in response to the event identifier included in the acknowledgment information matching the event identifier included in the second relationship instruction.

As a possible implementation in the embodiment of the disclosure, the apparatus further includes a query module and a sending module.

The acquiring module 141 is further configured to acquire a query request for a command queue sent by a control unit.

The query module is configured to query a remaining storage space included in the command queue based on the query request.

The sending module is configured to send the queried indication information of the remaining storage space to the control unit, to cause the control unit to store the second relationship instruction or the second computing instruction in the remaining storage space.

It should be noted that the foregoing explanation of the method embodiments is also suitable for the apparatus embodiments, with the same principle, which will not be repeated here.

In the apparatus for data processing in the embodiment of the disclosure, the first relationship instruction is acquired, and the at least one first computing instruction acquired before the first relationship instruction is executed based on the first relationship instruction, and the acknowledgment information is sent based on the first relationship instruction in response to completing executing the at least one first computing instruction, so that the second coprocessor receiving the acknowledgment information reverts to the state of acquiring the second computing instruction posterior to the second relationship instruction based on the acknowledgment information. In some embodiments of the disclosure, the acknowledgment information is generated between the first coprocessor and the second coprocessor based on the first relationship instruction, and self-coordination of running time between the coprocessors is realized based on the acknowledgment information, which enhances the overall running efficiency.

To achieve the above embodiments, an electronic device is provided in the embodiment. The electronic device includes: at least one processor; and a memory communicatively connected to the at least one processor; the memory is stored with instructions executable by the at least one processor, the instructions are executed by the at least one processor, to cause the at least one processor to perform the method as described in the above method embodiments.

To achieve the above embodiment, a non-transitory computer-readable storage medium stored with computer instructions is provided in the embodiment, the computer instructions are configured to cause the computer to perform the method as described in the above method embodiment.

To achieve the above embodiment, a computer program product including a computer program is provided in the embodiment of the disclosure, the computer program is configured to perform the method as described in the above method embodiment when performed by a processor.

According to the embodiment of the disclosure, an electronic device, a readable storage medium and a computer program product are further provided in the disclosure.

Figure 15:
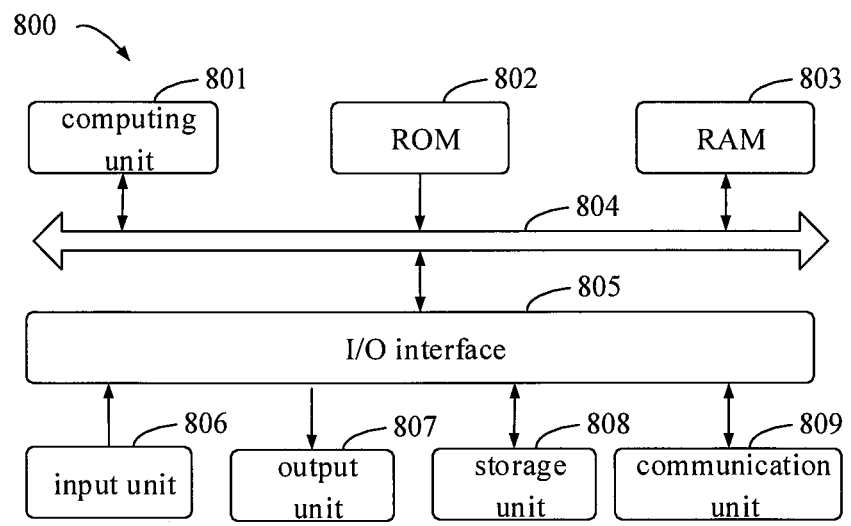
FIG. 15 is a schematic diagram illustrating an electronic device 800 according to an embodiment of the present disclosure.

FIG. 15 is a schematic diagram illustrating an electronic device 800 according to an embodiment of the present disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 15, the device 800 includes a computing unit 801, which may be configured to execute various appropriate actions and processes according to a computer program stored in a read-only memory (ROM) 802 or loaded from a storage unit 808 to a random access memory (RAM) 803. In a RAM 803, various programs and data required for a device 800 may be stored. A computing unit 801, a ROM 802 and a ROM 803 may be connected with each other by a bus 804. An input/output (I/O) interface 805 is also connected to a bus 804.

A plurality of components in the device 800 are connected to an I/O interface 805, and includes: an input unit 806, for example, a keyboard, a mouse, etc.; an output unit 807, for example various types of displays, speakers; a storage unit 808, for example a magnetic disk, an optical disk; and a communication unit 809, for example, a network card, a modem, a wireless transceiver. The communication unit 809 allows a device 800 to exchange information/data through a computer network such as internet and/or various types of telecommunication networks and other devices.

A computing unit 801 may be various types of general and/or dedicated processing components with processing and computing ability. Some examples of a computing unit 801 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 801 executes various methods and processes as described above, for example, a method for data processing. For example, in some embodiments, the method for data processing may be further implemented as a computer software program, which is physically contained in a machine readable medium, such as a storage unit 808. In some embodiments, a part or all of the computer program may be loaded and/or installed on the device 800 through a ROM 802 and/or a communication unit 809. When the computer program is loaded on a RAM 803 and performed by a computing unit 801, one or more blocks in the method for data processing as described above may be performed. Alternatively, in other embodiments, the computing unit 801 may be configured to perform a method for data processing in other appropriate ways (for example, by virtue of a firmware).

Various implementation modes of systems and technologies described herein may be implemented in a digital electronic circuit system, an integrated circuit system, a field programmable gate array (FPGA), a dedicated application specific integrated circuit (ASIC), an application specific standard product (ASSP), a system on a chip (SoC), a complex programmable logic device (CPLD), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of multiple programming languages. These programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be executed completely or partly on the machine, executed partly on the machine as an independent software package and executed partly or completely on the remote machine or server.

In the context of the present disclosure, a machine-readable medium may be a tangible medium that may contain or store a program intended for use in or in conjunction with an instruction execution system, apparatus, or device. A machine-readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a RAM, a ROM, an electrically programmable read-only memory (an EPROM) or a flash memory, an optical fiber device, and a compact disc read-only memory (CD-ROM), an optical storage device, a magnetic storage device, or any appropriate combination thereof.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). The examples of a communication network include a Local Area Network (LAN), a Wide Area Network (WAN), an internet and a blockchain network.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, also known as a cloud computing server or a cloud host, is a host product in a cloud computing service system, to solve the shortcomings of large management difficulty and weak business expansibility existed in the traditional physical host and Virtual Private Server (VPS) service. A server further may be a server with a distributed system, or a server in combination with a blockchain.

It should be noted that, Artificial intelligence(AI) is a subject that learns simulating certain thinking processes and intelligent behaviors (such as learning, reasoning, thinking, planning, etc.) of human beings by a computer, which covers hardware-level technologies and software-level technologies. AI hardware technologies generally include technologies such as sensors, dedicated AI chips, cloud computing, distributed storage, big data processing, etc.; AI software technologies mainly include computer vision technology, speech recognition technology, natural language processing (NLP) technology and machine learning(ML), deep learning (DL), big data processing technology, knowledge graph (KG) technology, etc.

It should be understood that, various forms of procedures shown above may be configured to reorder, add or delete blocks. For example, blocks described in the present disclosure may be executed in parallel, sequentially, or in a different order, as long as the desired result of the technical solution disclosed in the present disclosure may be achieved, which will not be limited herein.

The above specific implementations do not constitute a limitation on the protection scope of the present disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of embodiments of the present disclosure.

What is claimed is:

1. A method for data processing, performed by a first coprocessor in a chip, the method comprising:
   acquiring a first relationship instruction;
   executing at least one first computing instruction acquired before the first relationship instruction based on the first relationship instruction;
   sending acknowledgment information based on the first relationship instruction in response to completing executing the at least one first computing instruction, to cause a second coprocessor receiving the acknowledgment information to revert to a state of acquiring a second computing instruction based on the acknowledgment information, wherein the second computing instruction is acquired after the second coprocessor receives a second relationship instructions;
   acquiring a query request for a command queue sent by a control unit;
   querying a remaining storage space comprised in the command queue based on the query request; and
   sending queried indication information of the remaining storage space to the control unit, to cause the control unit to store the first relationship instruction or the first computing instruction in the remaining storage space.

2. The method according to claim 1, the first relationship instruction comprises an identifier of the second coprocessor having a dependency relationship with the first coprocessor;
   sending acknowledgment information based on the first relationship instruction in response to completing executing the at least one computing instruction comprises:
   sending the acknowledgment information to the second coprocessor based on the identifier of the second coprocessor indicated by the first relationship instruction in response to completing executing the at least one computing instruction.

3. The method according to claim 2, wherein the first relationship instruction comprises an event identifier;
   sending acknowledgment information based on the first relationship instruction in response to completing executing the at least one computing instruction comprises:
   broadcasting the acknowledgment information comprising the event identifier in response to completing executing the at least one computing instruction.

4. A method for data processing, performed by a second coprocessor in a chip, the method comprising:
   acquiring a second relationship instruction sent by a control unit;
   stopping acquiring a computing instruction from a command queue corresponding to the second coprocessor in response to acquiring the second relationship instruction;
   monitoring acknowledgment information sent by the first coprocessor;
   reverting to a state of acquiring a second computing instruction from the command queue based on the monitored acknowledgment information and the second relationship instruction;
   acquiring a query request for a command queue sent by a control unit;
   querying a remaining storage space comprised in the command queue based on the query request; and
   sending queried indication information of the remaining storage space to the control unit, to cause the control unit to store the second relationship instruction or the second computing instruction in the remaining storage space.

5. The method according to claim 4, wherein, the second relationship instruction comprises an identifier of the first coprocessor;
   reverting to the state of acquiring the second computing instruction from the command queue based on the monitored acknowledgment information and the second relationship instruction comprises:
   reverting to acquiring the second computing instruction from the command queue in response to an identifier of the first coprocessor comprised in the acknowledgment information matching the identifier of the first coprocessor comprised in the second relationship instruction.

6. The method according to claim 4, the second relationship instruction comprises an event identifier;
   reverting to the state of acquiring the second computing instruction from the command queue based on the monitored acknowledgment information and the second relationship instruction comprises:
   reverting to acquiring the second computing instruction from the command queue in response to the event identifier comprised in the acknowledgment information matching the event identifier comprised in the second relationship instruction.

7. A processor chip, comprising:
   a control unit, configured to send a first computing instruction and a first relationship instruction to the first coprocessor, and send a second computing instruction and a second relationship instruction to the second coprocessor;
   a first coprocessor, configured to perform a first method for data processing, comprising:
   acquiring a first relationship instruction;
   executing at least one first computing instruction acquired before the first relationship instruction based on the first relationship instruction;
   sending acknowledgment information based on the first relationship instruction in response to completing executing the at least one first computing instruction, to cause a second coprocessor receiving the acknowledgment information to revert to a state of acquiring a second computing instruction based on the acknowledgment information, wherein the second computing instruction is acquired after the second coprocessor receives a second relationship instruction;

acquiring a first query request for a first command queue sent by a control unit;

querying a first remaining storage space comprised in the first command queue based on the first query request; and sending queried indication information of the first remaining storage space to the control unit, to cause the control unit to store the first relationship instruction or the first computing instruction in the first remaining storage space;

a second coprocessor, configured to perform a second method for data processing, comprising:

acquiring a second relationship instruction sent by a control unit;

stopping acquiring a computing instruction from a command queue corresponding to the second coprocessor in response to acquiring the second relationship instruction;

monitoring acknowledgment information sent by the first coprocessor;

reverting to a state of acquiring a second computing instruction from the command queue based on the monitored acknowledgment information and the second relationship instructions;

acquiring a second query request for a second command queue sent by the control unit;

querying a second remaining storage space comprised in the second command queue based on the second query request; and sending queried indication information of the second remaining storage space to the control unit, to cause the control unit to store the second relationship instruction or the second computing instruction in the second remaining storage space.

8. The processor chip of claim 7, wherein the first relationship instruction comprises an identifier of the second coprocessor having a dependency relationship with the first coprocessor, and the second relationship instruction comprises an identifier of the first coprocessor;

sending acknowledgment information based on the first relationship instruction in response to completing executing the at least one computing instruction comprises:

sending the acknowledgment information to the second coprocessor based on the identifier of the second coprocessor indicated by the first relationship instruction in response to completing executing the at least one computing instruction;

reverting to the state of acquiring the second computing instruction from the command queue based on the monitored acknowledgment information and the second relationship instruction comprises:

reverting to acquiring the second computing instruction from the command queue in response to an identifier of the first coprocessor comprised in the acknowledgment information matching the identifier of the first coprocessor comprised in the second relationship instruction.

9. The processor chip of claim 8, wherein the first relationship instruction comprises an event identifier, and the second relationship instruction comprises an event identifier;

sending acknowledgment information based on the first relationship instruction in response to completing executing the at least one computing instruction comprises:

broadcasting the acknowledgment information comprising the event identifier in response to completing executing the at least one computing instruction;

reverting to the state of acquiring the second computing instruction from the command queue based on the monitored acknowledgment information and the second relationship instruction comprises:

reverting to acquiring the second computing instruction from the command queue in response to the event identifier comprised in the acknowledgment information matching the event identifier comprised in the second relationship instruction.

* * * * *